United States Patent
Aoki

(10) Patent No.: US 6,617,531 B1
(45) Date of Patent: Sep. 9, 2003

(54) SEAT LOAD MEASURING DEVICE

(75) Inventor: Hiroshi Aoki, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 09/666,720

(22) Filed: Sep. 20, 2000

Related U.S. Application Data

(60) Provisional application No. 60/154,961, filed on Sep. 21, 1999.

(51) Int. Cl.[7] .................. G01G 19/52; G01G 23/14; G01G 21/08; B60R 21/32; B60K 28/04
(52) U.S. Cl. .................. 177/144; 177/154; 177/170; 177/256; 180/273; 280/735
(58) Field of Search ................. 177/144, 170, 177/256, DIG. 9, 154; 180/273; 280/735

(56) References Cited

U.S. PATENT DOCUMENTS

| | | | | |
|---|---|---|---|---|
| 3,134,451 A | * | 5/1964 | Hanssen ............... | 177/256 |
| 4,189,708 A | | 2/1980 | Bryll ................. | 340/64 |
| 4,405,025 A | * | 9/1983 | Yanagita et al. ....... | 177/256 |
| 4,456,085 A | * | 6/1984 | Boyles ............... | 177/256 |
| 4,819,750 A | * | 4/1989 | Carnevale ............ | 177/256 |
| 5,612,876 A | | 3/1997 | Zeidler et al. ........ | 364/524 |
| 5,714,695 A | * | 2/1998 | Burns ................ | 177/211 |
| 5,810,392 A | * | 9/1998 | Gagnon ............... | 280/735 |
| 5,864,295 A | * | 1/1999 | Jarocha .............. | 180/273 |
| 6,069,325 A | * | 5/2000 | Aoki ................. | 177/136 |
| 6,092,838 A | * | 7/2000 | Walker ............... | 280/735 |
| 6,323,444 B1 | * | 11/2001 | Aoki ................ | 177/144 |
| 6,342,683 B1 | * | 1/2002 | Aoki et al. .......... | 177/144 |

FOREIGN PATENT DOCUMENTS

| | | |
|---|---|---|
| DE | 44 06 897 | 5/1995 |
| EP | 0900705 | 3/1999 |
| GB | 2333070 | 7/1999 |
| WO | 98/41424 | 9/1998 |

* cited by examiner

Primary Examiner—Randy W. Gibson
(74) Attorney, Agent, or Firm—Foley & Lardner

(57) ABSTRACT

To provide a seat load measuring device which is capable of reducing production cost and assembly cost and which makes it possible to measure the weight of the person on the seat more accurately. The device measures the load of a seat of a passenger vehicle (including the load of an object placed on the seat), wherein the load of the seat is received at three positions, the load being put together in a load cell and transmitted through a transmission mechanism, load measurement being performed by a load cell or a load measurement plate.

11 Claims, 5 Drawing Sheets

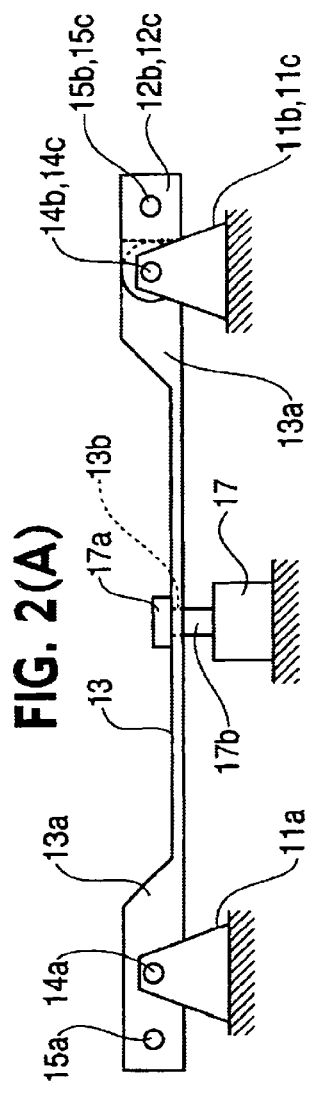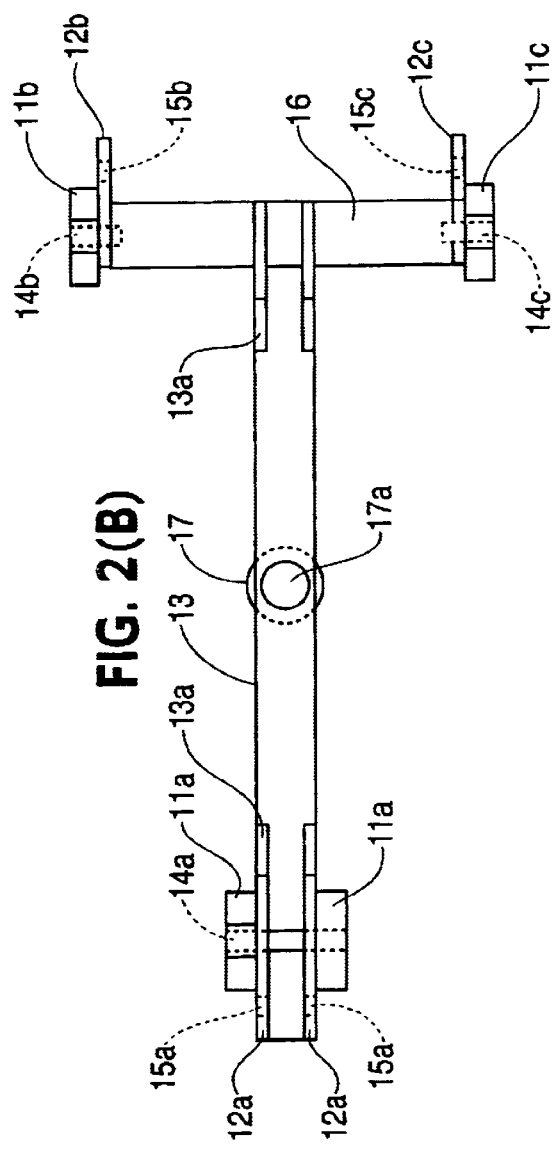

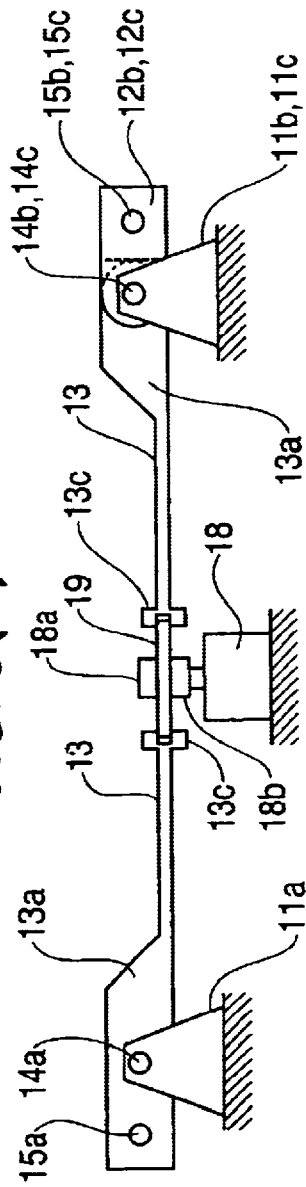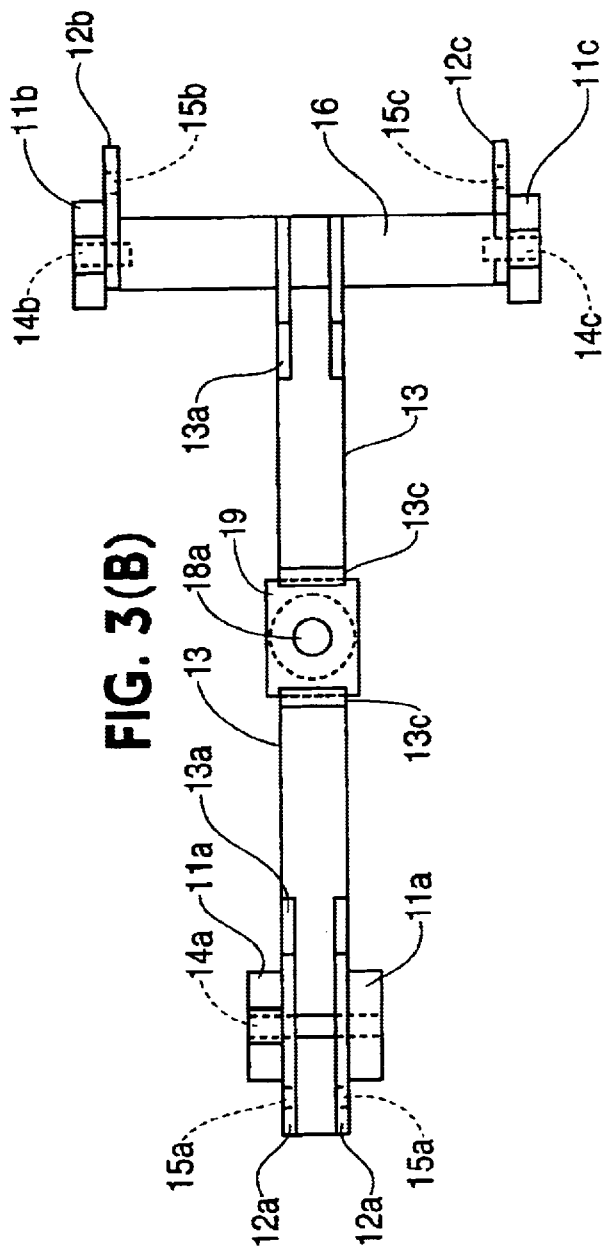

SEAT LOAD MEASURING DEVICE

This application claims the benefit of and priority to U.S. Provisional Application No. 60/154,961, filed Sep. 21, 1999, the disclosure of which is hereby incorporated by reference herein in its entirety.

BACKGROUND OF THE INVENTION

1. Field of Invention

The present invention relates to a device for measuring a seat load, including measuring the load of an object placed on a passenger seat or the like.

2. Description of the Related Art

An automobile is provided with a seat belt or an air bag as equipment for securing the safety of the passenger. Recently, to further improve the performance of the seat belt or the air bag, there is the possibility to control the operation of such safety equipment in accordance with the weight and attitude of the passenger. For example, the amount of gas generated for the air bag or the amount of pre-tension created for the seat belt is adjusted in accordance with the weight and attitude of the passenger. For these purposes, it is necessary to know by some way the weight of the passenger sitting on the seat. Further, to assume the attitude of the passenger, the position of the center of gravity of the passenger on the seat needs to be known as well.

As an example of the means for knowing the weight and the center of gravity of the passenger, Japanese Unexamined Patent Application Publications No. 11-1153 and 11-30457 disclose a method according to which the seat weight including the weight of the passenger is measured by obtaining the sum total of the vertical loads applied to a load cell. With this method, it is also possible to know the position of the center of gravity of the passenger on the seat.

Such a seat weight measuring device must be as inexpensive as possible because it is mounted in an ordinary automobile. Further, the wiring, assembly, etc. of the device must also be of a simple design. Additionally, to perform the correct measurements, it is desired to prevent as much as possible a weight other than the weight of the passenger (or an object) on the seat from being applied to the sensor.

SUMMARY OF THE INVENTION

The present invention has been made in view of the above problems. It is accordingly an object of the present invention to provide a seat weight which makes it possible in a seat of the type which supports the seat load at three points to reduce the production/assembly cost and to measure the weight of the person on the seat more correctly.

As a first embodiment for solving the above problems, there is provided a seat load measuring device for measuring the load of a seat of a passenger vehicle (including the load of an object placed on the seat), wherein the load of the seat is received at three positions, the load being put together in a single load cell and transmitted through a transmission mechanism, load measurement being performed by the single load cell.

In the seat to which the present invention is applied, the seat load is supported at three positions (usually a one front central position and rear right and left positions). Thus, in this means, the seat load is received at three positions corresponding to these support portions. And, by means of the load transmission mechanism, these loads are put together into a single load cell for transmission, the entire seat load being measured by the single load cell. Thus, a single load cell suffices, which reads to a reduction in cost since a measurement circuit, wiring, etc. are omitted.

As a second embodiment for solving the above problems, there is provided a seat load measuring device for measuring the load of a seat of a passenger vehicle (including the load of an object placed on the seat), wherein the load of the seat is received at three positions, the load being transmitted to a single load measurement plate to which a strain gauge is mounted through a transmission mechanism to perform load measurement, the strain gauge being mounted to the load measurement plate such that the strain gauge is capable of independently measuring the load of at least one of the three positions.

In this embodiment, the method of receiving the seat load is the same as the first means. However, the load measurement device is not a single load cell but a single load measurement plate. A load received at three points is transmitted to this load measurement plate through a load transmission mechanism. A strain gauge is mounted to the load measurement plate such that the load of at least one of the three positions can be independently measured. Thus, with this means, it is possible to independently measure the load of three positions, making it possible to measure the position of the center of gravity.

As a third embodiment for solving the above problems, there is provided a seat load measuring device which is the above-mentioned first or second means, wherein the transmission mechanism includes a lever mechanism rotating around a horizontally oriented axis, receiving the load of the seat at the force point portion of the lever mechanism and transmitting the load to the load cell or the load measurement plate at the point of application, a deflection mechanism being provided between the rotation axis and the point of application.

In this embodiment, the load is transmitted through the lever mechanisms (in the case of the first means, two or three lever mechanisms, and in the case of the second means, three lever mechanisms), a deflection mechanism being provided between the rotation axis (fulcrum) and the point of application of this lever mechanism. Thus, when a seat load is applied to the force point portion, the lever transmits the load to the load cell or the load measurement plate as it is deflected by the deflection mechanism portion. Thus, even when there is a play in the load measurement mechanism and the seat support portion in front of it, the play is absorbed by this deflection mechanism, so that it is possible to prevent the measurement value becoming incorrect due to the play and, at the same time, to facilitate the assembly.

As a fourth embodiment for solving the above problems, there is provided a seat load measuring device which is one of the first through third means, wherein a play which permits positional deviation of the point of application generated due to deflection of the lever is provided in the joint portion of the point-of-application portion of the lever and the load cell or the load measurement plate.

In the above third embodiment, when the lever is deflected in the deflection portion, the horizontal length changes slightly. In this means, a play which absorbs such a variation in length is provided in the joint portion of the point-of-application portion of the lever and the load cell or the load measurement plate, so that if this is generated, no stress is generated, and the load measurement is not made incorrect by such stress. By providing such a play in the means other than the third means, the assembly is facilitated.

As a fifth embodiment for solving the above problems, there is provided a seat load measuring device which is one of the first through fourth embodiments, wherein a vertical play is provided in the joint portion of the point-of-application portion of the lever and the load cell or the load measurement plate.

In this embodiment, a vertical play is provided in the joint portion of the point-of-application portion of the lever and the load cell or the load measurement plate, so that even when there is a play in the load measurement mechanism or the seat supporting portion in front of it, such a play is absorbed by the play provided in the joint portion of the point-of-application portion of the lever and the load cell or the load measurement plate, whereby it is possible to prevent the measurement value from being made incorrect due to the play and, at the same time, the assembly is facilitated.

As a sixth embodiment for solving the above problems, there is provided a seat load measuring device which is one of the first through fifth embodiment, wherein a mechanism for preventing a load larger than a predetermined load from being transmitted to the load cell or the load measurement plate is provided in the portion receiving the seat load.

In this means, a mechanism for preventing a load larger than a predetermined load from being transmitted to the load cell or the load measurement plate when a load larger than a predetermined load is applied to the portion receiving the seat load (the force point portion) is provided in the portion receiving the seat load (the force point portion). Thus, it is possible to prevent the load cell or the load measurement plate from being damage under a load larger than a predetermined load or prevent the measurement from being performed in an abnormal manner.

BRIEF DESCRIPTION OF THE DRAWINGS

FIG. 2(A) is a side view and FIG. 2(B) is a top view showing the first embodiment of the seat load measuring device of the present invention.

FIG. 3(A) is a side view and FIG. 3(B) is a top view showing the second embodiment of the seat load measuring device of the present invention.

DETAILED DESCRIPTION OF THE PREFERRED EMBODIMENTS

Figure 1A:
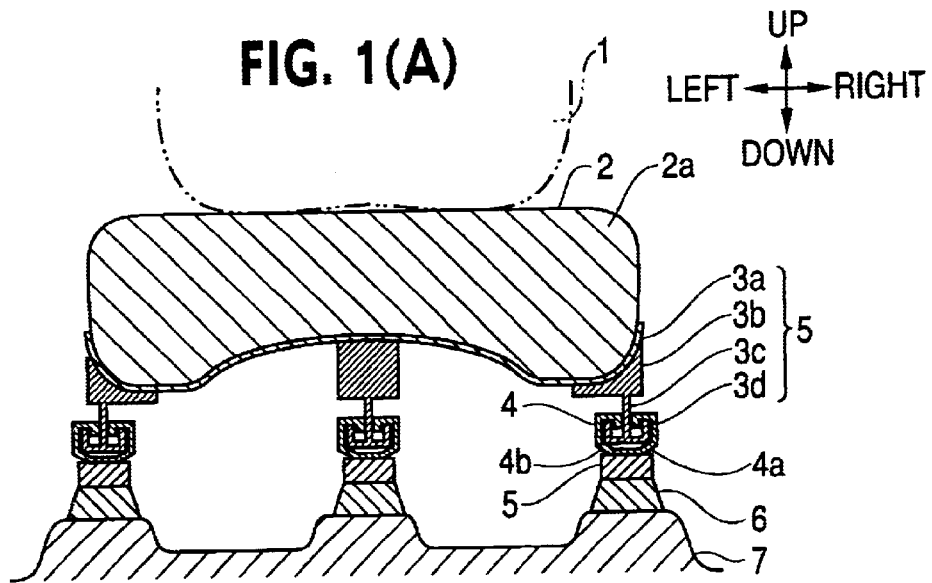
FIG. 1(A) is a back, sectional view
Figure 1B:
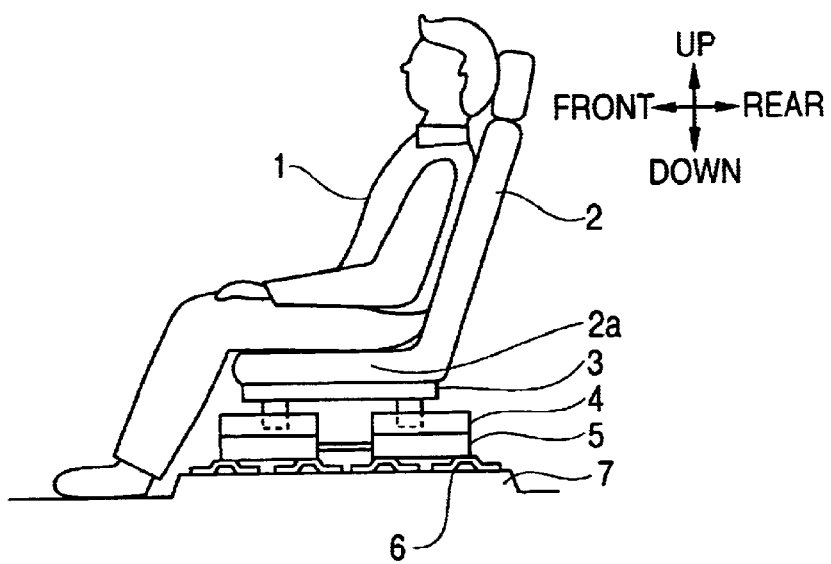
FIG. 1(B) is a side view showing an automobile seat and a support portion thereof to which the present invention is to be applied.

An embodiment of the present invention will now be illustrated with reference to the drawings. FIGS. 1(A) and 1(B) are diagrams showing an automobile seat to which the present invention is applied and a support portion for the same. This seat has a three point support structure in which the front portion is supported at one central point and in which the rear portion is supported at two, right and left, points, three rails, in correspondence thereto, being provided one at the center of the front portion and two, right and left ones, on either side of the rear portion.

A person 1 sits on a seat cushion 2a of a seat 2. The lower side of the seat cushion 2a is supported by a seat frame 3 formed of steel plate. The seat frame 3 is composed of a bottom plate 3a, a support base 3b, a longitudinal plate 3c, a slide plate 3d, etc. The bottom plate 3a spreads so as to cover the lower surface of the seat cushion 2a. The support base 3b is arranged so as to support the lower side of the bottom plate 3a. The longitudinal plate 3c extends vertically downward from the central portion of the lower surface of the support base 3b. The slide plate 3d protrudes to the right and left of the longitudinal plate 3c in a wing-like manner, with its forward end portion being bent upwardly.

Three seat rails 4, which are parallel to each other, are provided at the center of the front portion of the seat 2, and the right and left positions of the rear portion thereof so as to extend in the longitudinal direction. Each seat rail 4 has a U-shaped cross-sectional configuration, and has in it a recess 4b. The upper portion of this recess 4b constitutes a groove 4a extending in the longitudinal direction. The longitudinal plate 3c of the seat frame 3 is in this groove 4a. The slide plate 3d of the seat frame 3 is in the recess 4b of the seat rail 4. The slide plate 3d is longitudinally slidable inside the seat rail 4.

A seat load measuring device 5 is connected to the lower side of the seat rail 4. Seat brackets 6 are mounted to the longitudinal ends of the lower side of the seat load measuring device 5. These seat brackets 6 are fastened to a seat mounting portion 7 of the vehicle body by bolts or the like.

FIG. 2 is a diagram schematically showing the first embodiment of the seat load measuring device of the present invention. This seat load measuring device are supported by three support portions 11a, 11b and 11c. The support portion 11a receives the load applied to the seat rail at the center of the front portion of the seat, the support portion 11b receives the load applied to the seat rail on the right side of the rear portion of the seat, and the support portion 11c receives the load applied to the seat rail on the left side of the rear portion of the seat. As described below, each load is transmitted to a member constituting a lever through a pin fitted into a pin hole 15a, 15b, 15c provided in the member constituting the lever.

The member constituting the lever is formed by side plates 12a, 12b and 12c, a deflection member 13, a reinforcing side plate 13a and right and left connection members 16, and rotatably supported by rotation shafts 14a, 14b and 14c provided in the three support portions 11a, 11b and 11c. A load cell 17 is arranged at the center of an axis connecting the rotation shaft 14a and the rotation shafts 14b, 14c. And, the deflection member 13 has a hole 13b at a position corresponding to the load cell 17, and a neck portion 17b of the load cell 17 is fitted into this hole 13b.

When the load of the seat rails is applied to the pins in the pin holes 15a, 15b, 15c, which are the points of application thereof, the lever mechanism receives a rotating force around the rotation shafts 14a, 14b, 14c, and the deflection member 13 receives an upward rotating force. At this time, the deflection of the portion of the deflection member 13 where the reinforcing side plate 13a exists is restrained, and the central portion where there is no reinforcing side plate 3a is upwardly deflected, pushing up the head portion 17a of the load cell 17 from below. By measuring this force, the load cell 17 measures the seat load.

Side plates 12b and 12c are firmly attached to a right-and-left connection member 16. Thus, the rotating forces applied to the pin holes 15b and 15c are put together, generating a moment causing the right-and-left connection member 16 to rotate. As stated above, the load cell 17 is arranged halfway between the rotation shaft 14a and the axis connecting the rotation shafts 14b and 14c. And, the distance between the rotation shaft 14a and the pin hole 15a, the distance between the rotation shaft 14b and the pin hole 15b, and the distance between the rotation shaft 14c and the pin hole 15c are equal to each other, so that the loads applied to the pin holes 15a, 15b and 15c act on the load cell 17 at the same lever ratio. Thus, it is possible to measure the sum total of the loads applied to three points with the single load cell 17, making it possible to know the entire seat load.

In this embodiment, the lever mechanism is not formed of a rigid material, and has a deflection member which easily undergoes elastic deformation. Thus, even when there is a play inside the load measuring mechanism or between the seat rails, etc. and the load measuring mechanism, the play is absorbed by the deflection member 13, so that the load is correctly transmitted to the load cell 17. Thus, correct measurement is possible, and the assembly of the load measuring mechanism and the peripheral members is facilitated.

Further, in this embodiment, the load cell 17 and the deflection member 13 are not directly constrained, and the neck portion 17b is fitted into the hole 13a, there being play in the vertical, lateral and longitudinal directions between the deflection member 13 and the load cell 17. Of these, the vertical play is absorbed by the deflection of the deflection member 13 as stated above. Further, since there is play also in the lateral and longitudinal directions, the assembly is facilitated and, even if the deflection member 13 is deformed, the deformation can be absorbed.

While in FIG. 2 the deflection member 13 is formed integrally on the right and left sides of the load cell 17, it is also possible not to form it as an integral member if the integral structure is an obstacle to securing measurement accuracy, forming right and left deflection members separately, each pushing up the head portion 17a of the load cell 17 from below. In the third means for solving the problems, both the structure of FIG. 1, in which the front and rear lever mechanisms are joined at the center, and the structure in which they are separated at the center to form separate members, are regarded as two levers.

Further, while in FIG. 2 the deflection member 13 is flat, it is desirable, as stated below, that the deflection member 13 be of a forwardly tapered, forked configuration so that the stress applied to the various portions of the deflection member may be uniform.

FIG. 3 is a basic schematic diagram schematically showing a second embodiment of the seat load measuring device of the present invention. In this example, the construction of the portion receiving the load and the portion transmitting the load is basically the same as that of the first embodiment, and only the portion measuring the load is different, so only the different portion will be described.

In this embodiment, instead of the load cell of FIG. 2, there is provided a load measurement plate 19 fastened to a support body 18. The load measurement plate 19 is held from above and below by fastening members 18a and 18b of the support body 18. To the right and left of the load measurement plate 19, there is incorporated a strain gauge. When the load measurement plate receives a vertical bending force, the distortion is measured.

On the other hand, the forward end portion of the two deflection members 13 are formed as forked portions 13c, and the end portions of the load measurement plate 19 are held by the forked portions 13c. The forked portions 13c and the load measurement plate 19 are not fastened to each other but some play is left between them.

When the seat load is applied to this load measuring mechanism, the deflection member 13 is upwardly deflected as stated above, whereby the forked portions 13b abut the load measurement plate 19, thereby imparting an upward bending load to the load measurement plate 19. This bending load is measured by the strain gauge, whereby the load is measured. In this case, the load applied to the front side of the seat and the load applied to the rear side of the seat are separately measured, so that the measurement values are electrically added together, or added together in a software-like manner, thereby measuring the seat load.

As stated above, there is play between the forked portions 13c and the load measurement plate 19, so that the assembly is easy. Further, even when the deflection member 13 is deflected to be thereby changed in length, no excess stress is thereby applied to the measurement portion.

Figure 4:
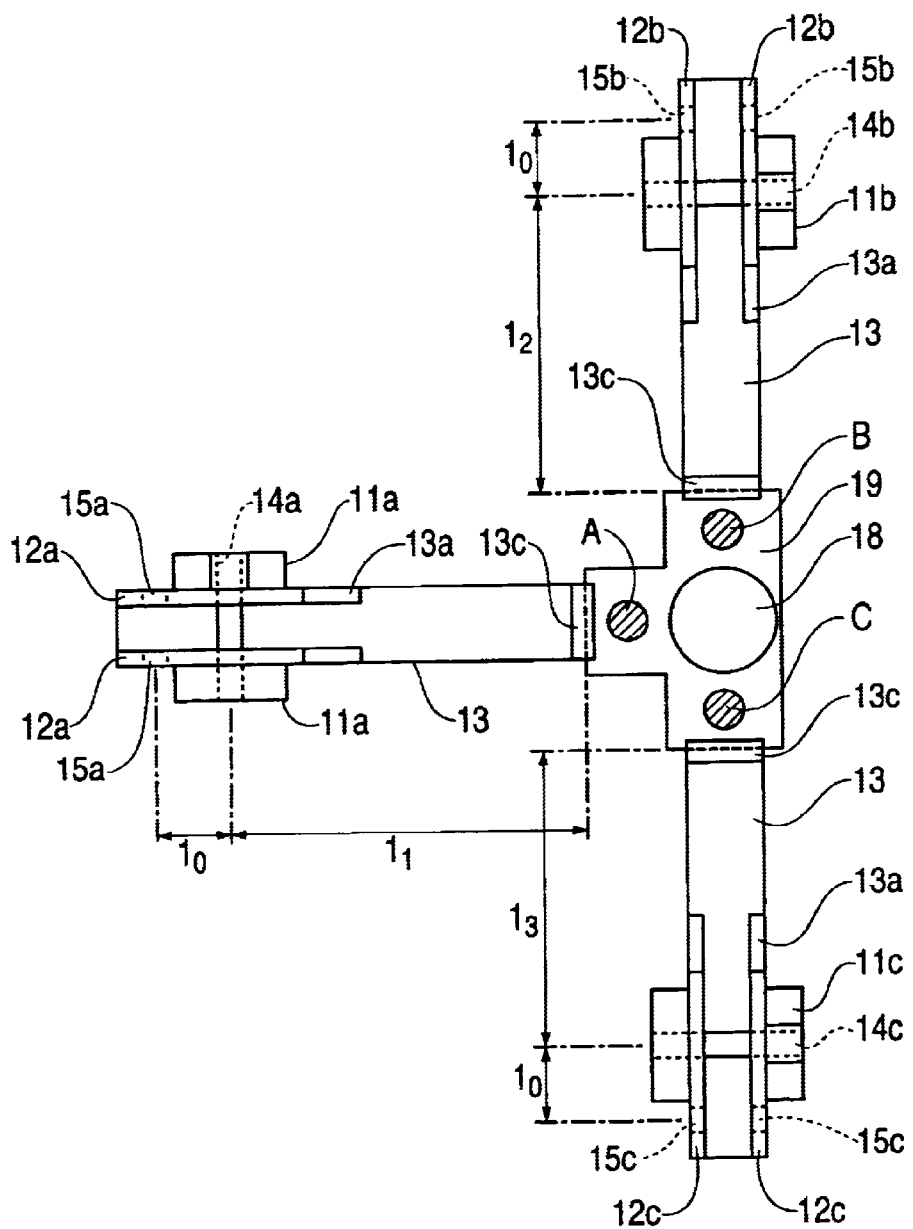
FIG. 4 is a top view showing the third embodiment of the seat load measuring device of the present invention.

FIG. 4 is a basic schematic diagram schematically showing a third embodiment of the seat load measuring device of the present invention. In this example, the construction of the portion receiving the load is basically the same as that of the first embodiment, and the construction of the portion transmitting the load is similar to that of the second embodiment, so only the portion different from them will be described.

As in the second embodiment, in this embodiment, there is provided a load measurement plate 19 fastened to a support body 18. As shown in the drawing, the load measurement plate 19 is T-shaped, and three strain gauges A, B and C are respectively mounted to the branch portions of the T-shaped measurement plate. When the load measurement plate 19 receives a vertical bending force, each strain gauge measures the distortion.

In this embodiment, in the load receiving portion and the load transmitting portion, there are provided also in the right and left rear portions the same mechanism as shown in FIG. 3, in which the load of the central front portion is received and transmitted to the load measurement plate 19, the load of the right rear portion and the load of the left rear portion being separately transmitted to the load measurement plate 19.

The load applied to the central front portion, the load applied to the right rear portion, and the load applied to the left rear portion are independently measured by the strain gauge A, the strain gauge B and the strain gauge C, respectively. Of the load measurement plate 19, the portion constrained by the support body 18 is made sufficiently large (In an extreme case, the central portion is constrained by the support body 19 so that each branch portion may independently protrude from the support body 18) whereby no load interference occurs between the branches of the load measurement plate 19. As in the embodiment shown in FIG. 3, in this embodiment, the forward end portion of each branch of the load measurement plate 19 is held by the forked portion 13c of the corresponding deflection member 13 with some play.

In FIG. 4, the distance $l_0$ between the pin hole 15a, 151 15c, which is the force point receiving the load, and the rotation shaft 14a, 14b, 14c, which is the fulcrum, is the same. Assuming that the distances between the rotation shafts 14a, 14b and 14c, which are fulcrums, and the forked portions 13c, which constitute point of application, are $l_1$, $l_2$, and $l_3$, and that the outputs of the strain gauges A, B and C are $W_A$, $W_B$ and $W_C$, the seat load W can be obtained as follows: $W = k \ (W_A * l_1 + W_B * l_2 + W_C * l_3)/l_0$ where k is a constant.

Figure 5A:
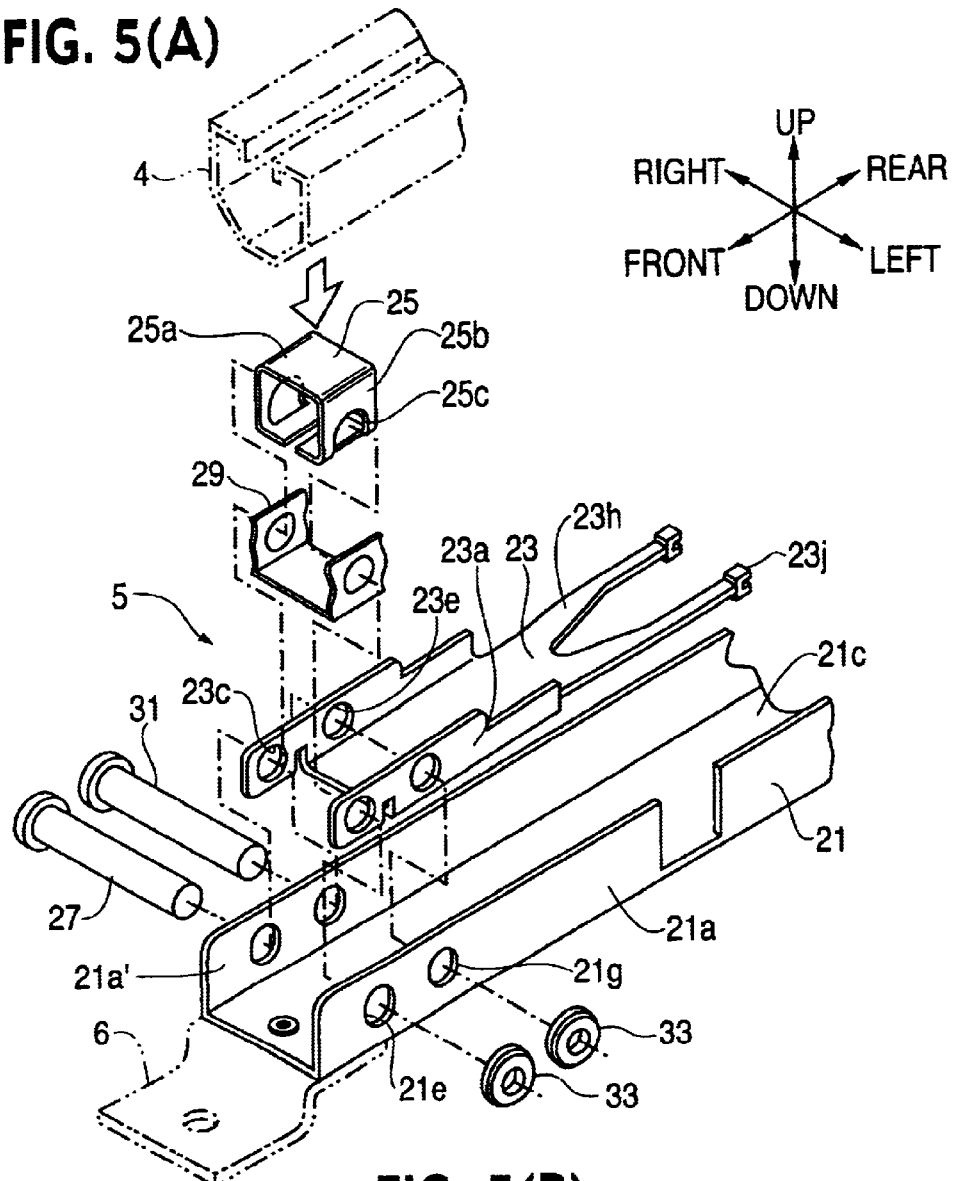
FIG. 5(A) is an exploded perspective and FIG. 5(B) is front sectional view showing an example of the construction of the seat load receiving portion of FIG. 3.
Figure 5B:
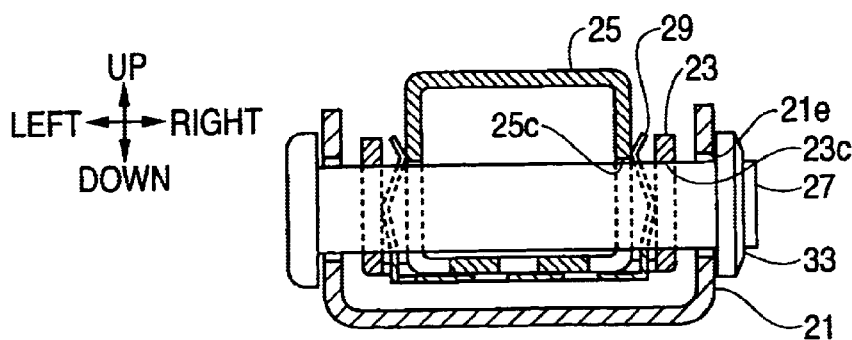

In the following, an example of the construction of the portion receiving the seat load in FIG. 3 will be illustrated in detail with reference to FIG. 5. FIG. 5(A) is an exploded perspective view and FIG. 5(B) is a front sectional view of the pin bracket portion. This diagram shows the portion receiving the load of the central front portion of the seat in FIG. 3. The construction of the portion receiving the right and left rear portions in FIG. 3 and the construction of the portions receiving the load in FIGS. 2 and 4 are similar to this construction. By combining these diagrams, it would be easy for a person skilled in the art to know how the actual load receiving portion of each portion of each drawing should be constructed.

However, in FIG. 5, for the convenience of explanation, the same components as those of FIG. 3 are in some cases indicated by different reference numerals. Further, the same components may be referred to by different terms. However, by referring to the drawings, it would be easy to know the correspondence of the numerals and the components. Further, in FIG. 5, the forward end portion of the deflection member is forked, and tapered toward the forward end. This is for the purpose of making the stress applied to the various portions of the deflection member uniform.

The seat weight measuring device 5 is formed using a thin and narrow base 21 as a base body. When mounted to the vehicle body, the base 21 extends in the longitudinal direction. It is a steel stamping having a U-shaped cross sectional configuration which is open on the top side. The bottom portion of the base 21 is referred to as a bottom plate 21c, and the portions bent at the right and left ends of the bottom plate 21c a right angles and raised are referred to as side plates 21a and 21a'. This base 21 corresponds to the support portion 11a of FIG. 3. The base 21 is secured to the vehicle body through the intermediation of a seat bracket.

The base side plates 21a and 21a' have front and rear pin holes 21e and 21g. The holes 21e and 21g are open in opposition to the right and left side plates 21a and 21a'. As shown in portion (A), the front holes 21e are vertically elongated holes. A bracket pin 27 is passed through these elongated holes 21e. Retainers 33 are attached to the right and left ends of the bracket pin 27. Due to these retainers 33, the bracket pin 27 is prevented from coming off the elongated holes 21e.

However, there are vertical and lateral gaps between the bracket pin 27 and the elongated holes 21e. Normally, the bracket pin 27 does not come into contact with the inner edges of the elongated holes 21e. However, when an excessive load is applied to this seat weight measuring device 9 (more specifically, the portion corresponding to the pin bracket 25), the bracket pin 27 is lowered and abuts the lower edge of the elongated holes 21e, so that the excessive load is not transmitted to the load sensor. That is, the pin 27 and the elongated holes 21e constitute a part of the mechanism for restricting the upper limit of the load applied to the sensor plate. This mechanism prevents a load larger than a predetermined load from being applied to the load cell or the load measurement plate. The main function of the bracket pin 27 is to transmit the seat weight applied to the pin bracket 25 to a Z-arm 23 (corresponding to the deflection member 13 of FIG. 3).

At positions somewhat nearer to the center, there are provided pin holes 21g. Passed through the holes 21g is a base pin 31 (corresponding to the rotation shaft 14a in FIG. 3). The base pin 31 exists so as to bridge the right and left base side plates 21a and 21a'. Retainers 33 are attached to the right and left ends of the pin 31 to secure the base pin 31 to the base 21. The base pin 31 is the rotation center shaft of the Z-arm 23.

The Z-arm 23 is arranged on the inner side of the base 21. The plan configuration of the Z-arm 23 is such that the portion thereof nearer to the center is forked (branching portion 23h) and that the portion nearer to the forward end is rectangular. At the right and left ends of the other half of the Z-arm 23 nearer to the forward end, there are formed side plates 23a bent upwardly at right angles (corresponding to the reinforcing side plates 13a of FIG. 3). The branching portion 23h is simply a flat plate. The side plates 23a extends along the inner sides of the side plates 21a of the base 21. However, there are gaps between the side plates 23a and 21a.

The Z-arm side plates 23a also have two pin holes 23c (corresponding to the pin hole 15a of FIG. 3) and 23e. The bracket pin 27 is passed through the pin holes 23c nearer to the forward end. There occurs scarcely any sliding movement between the pin holes 23c and the bracket 27. The base pin 31 is passed through the pin holes 23e nearer to the center. The base pin 31 is the rotation center of the Z-arm 23, and there occurs sliding movement between the pin holes 23e and the base pin 31 corresponding to the rotation of the Z-arm 23. A disc-like holed spacer is fitted onto the outer periphery of the base pin 31 between the base side plates 21a and Z-arm side plates 23a.

The length of the branching portion 23h of the Z-arm 23 corresponds to substantially the half of the entire length of the Z-arm 23. The portion 23h is branched off to the right and left, extending in the longitudinal direction nearer to the center and becoming narrower toward the forward end. The application portion at the forward end of the Z-arm branching portion 23h is formed as a forked portion 23j (corresponding to the forked portion 13c of FIG. 3).

As shown in the drawing, the pin bracket 25 has a substantially U-shaped cross-sectional configuration which is open on the bottom side. The top surface 25a of the pin bracket 25 is flat, and the seat rail 4 is placed thereon. They are firmly joined to each other by bolts or the like.

The right and left side plates 25b of the pin bracket 25 extend downwardly on the right and left sides of the bracket 25, and the lower end portions thereof are inwardly bent. The side plates 25b are arranged inside the Z-arm side plates 23a with some play therebetween. The side plates 25b have pin holes 25c. The bracket pin 27 is passed through these holes 25c. The diameter of the pin holes 25c is larger than the diameter of the bracket pin 27. Due to the gaps between them, dimensional errors of the seat and vehicle body and inadvertent deformation can be absorbed.

A spring plate 29 is placed between the right and left side plates 25b of the pin bracket 25 and the right and left side plates 23a of the Z-arm. The spring plate 29 has spring-washer-like holed portions and is fitted on the outside of the bracket pin 27 with some play left therebetween. This spring plate 29 constitutes a centering mechanism biasing the pin bracket 25 in the center direction. This centering mechanism causes the pin bracket 25 to be positioned as near as possible the center of the slidable range.

The load of the seat is applied to the pin bracket 25 through the seat rail 4. When the load is applied to the pin bracket 25, the load provides a force which causes the Z-arm 23 to be rotated around the base pin 31 which is the rotation shaft through the bracket pin 27, whereby the branching portion 23h of the Z-arm which is the deflection member is deflected and the Z-arm 23 is slightly rotated (5 degrees at maximum), and the forked portion 23j which is the application portion transmits the load to the load measurement plate.

As described above, the load can be collectively transmitted to a single load cell by the load transmitting mechanism, and the entire seat load is measured by the single load cell, so that a single load cell suffices, and a measurement circuit and wiring are omitted to achieve a reduction in cost. The load of at least one of three positions can be independently measured, making it possible to measure the position of the center of gravity. Even when there is play in the load measuring mechanism and the seat support portion in front thereof, the play is absorbed by this deflection mechanism, so that it is possible to prevent the measurement value from becoming incorrect due to the play and facilitate the assembly. Further, even when the lever is deflected in the deflecting portion and its length is changed, the change can be absorbed, and the assembly is facilitated. It is possible to prevent the measurement value from becoming incorrect due to play, and the assembly is facilitated. Additionally, it is possible to prevent the load cell or the load measurement plate from being damaged under an excessive load or the measurement from being performed in an abnormal manner.

As described, the present invention is capable of measuring a seat load, including measuring the load of an object placed on a passenger seat or the like. Accordingly, it is to be understood that the present invention is not limited to the details of any one embodiment in any one figure, but are defined by the appended claims. The scope of the appended claims should be interpreted to encompass all such modifications, similar arrangements and procedures.

I claim:

1. A seat load measuring device for measuring the load of a seat of a passenger vehicle, comprising a mechanism in which the load is received at three positions and combined in a single load cell and transmitted through a transmission mechanism, and the load measurement being performed by the load cell.

2. The seat load measuring device of claim 1, wherein the transmission mechanism includes a lever mechanism rotating around a horizontally oriented axis, receives the load of the seat at the force point portion of the lever mechanism and transmits the load to the load cell at the point of application, a deflection mechanism being provided between the rotation axis and the point of application.

3. The seat load measuring device of claim 2, wherein a play is provided which permits positional deviation of the point of application generated due to deflection of the lever in a joint portion of the point-of-application portion of the lever and the load cell.

4. The seat load measuring device of claim 2, wherein a vertical play is provided in the joint portion of the point-of-application portion of the lever and the load cell.

5. A seat load measuring device for measuring the load of a seat of a passenger vehicle, comprising a mechanism in which the load is received at three positions, the load being put together in a single load cell and transmitted through a transmission mechanism, and the load measurement being performed by the load cell;

further comprising a mechanism for preventing a load larger than a predetermined load from being transmitted to the load cell in the portion receiving the seat load.

6. A seat load measuring device for measuring the load of a seat of a passenger vehicle, comprising a mechanism in which the load of the seat is received at three positions, the load being transmitted to a load measurement plate to which a strain gauge is mounted through a transmission mechanism to perform the load measurement, the strain gauge being mounted to the load measurement plate such that the strain gauge is capable of independently measuring the load of at least one of the three positions.

7. The seat load measuring device of claim 6, wherein a single load measurement plate is incorporated into the device.

8. The seat load measuring device of claim 6, wherein the transmission mechanism includes a lever mechanism rotating around a horizontally oriented axis, receiving the load of the seat at the force point portion of the lever mechanism and transmitting the load to the load measurement plate at the point of application, a deflection mechanism being provided between the rotation axis and the point of application.

9. The seat load measuring device of claim 8, wherein a play which permits positional deviation of the point of application generated due to deflection of the lever is provided in the joint portion of the point-of-application portion of the lever and the load measurement plate.

10. The seat load measuring device of claim 8, wherein a vertical play is provided in a joint portion of the point-of-application portion of the lever and the load measurement plate.

11. A seat load measuring device for measuring the load of a seat of a passenger vehicle, comprising a mechanism in which the load of the seat is received at three positions, the load being transmitted to a load measurement plate to which a strain gauge is mounted through a transmission mechanism to perform the load measurement, the strain gauge being mounted to the load measurement plate such that the strain gauge is capable of independently measuring the load of at least one of the three positions;

wherein a mechanism for preventing a load larger than a predetermined load from being transmitted to the load measurement plate is provided in the portion receiving the seat load.

* * * * *